US010896537B2

(12) United States Patent
Buys et al.

(10) Patent No.: US 10,896,537 B2
(45) Date of Patent: Jan. 19, 2021

(54) THREE-DIMENSIONAL RECONSTRUCTION OF AUTOMATED LIGHTING FIXTURES AND THEIR OPERATIONAL CAPABILITIES

(71) Applicant: Electronic Theatre Controls, Inc., Middleton, WI (US)

(72) Inventors: Koen Buys, Hofstade (BE); Dennis Varian, Middleton, WI (US); Josh Jordan, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/708,768

(22) Filed: Dec. 10, 2019

(65) Prior Publication Data
US 2020/0184713 A1 Jun. 11, 2020

Related U.S. Application Data

(60) Provisional application No. 62/777,481, filed on Dec. 10, 2018.

(51) Int. Cl.
*G06T 15/50* (2011.01)
*G06T 17/20* (2006.01)
(Continued)

(52) U.S. Cl.
CPC ............ *G06T 15/506* (2013.01); *G06T 17/00* (2013.01); *G06T 17/20* (2013.01); *G06T 19/20* (2013.01);
(Continued)

(58) Field of Classification Search
CPC .................................. G06T 19/20; H05B 47/10
See application file for complete search history.

(56) References Cited

U.S. PATENT DOCUMENTS 5,307,295 A  4/1994 Taylor et al.
5,406,176 A  4/1995 Sugden
(Continued)

FOREIGN PATENT DOCUMENTS

WO      2017042027 A1     3/2017

OTHER PUBLICATIONS

Combined Search and Examination Report issued by the United Kingdom Intellectual Property Office for Application No. 1918097.5 dated Jun. 26, 2020 (6 pages).
(Continued)

*Primary Examiner* — Phi Hoang
(74) *Attorney, Agent, or Firm* — Michael Best and Friedrich LLP

(57) ABSTRACT

Systems and methods for generating a three-dimensional model of a lighting fixture. The systems include a controller that includes an electronic processor coupled to a memory. The memory is configured to store instructions that when executed by the electronic processor configure the controller to receive first scanning data related to a lighting fixture while the lighting fixture is in a first configuration, receive second scanning data related to the lighting fixture after an adjustment to the lighting fixture to a second configuration, compare the first scanning data and the second scanning data, perform three-dimensional mesh reconstruction based on the first scanning data and the second scanning data, and generate the three-dimensional model based on the first configuration of the lighting fixture and the second configuration of the lighting fixture representing an operational capability of the lighting fixture.

25 Claims, 16 Drawing Sheets

(51) Int. Cl.
*G06T 17/00* (2006.01)
*G06T 19/20* (2011.01)
*F21V 21/15* (2006.01)
*H05B 47/10* (2020.01)

(52) U.S. Cl.
CPC ....... *F21V 21/15* (2013.01); *G06T 2219/2012* (2013.01); *G06T 2219/2016* (2013.01); *H05B 47/10* (2020.01)

(56) References Cited

U.S. PATENT DOCUMENTS

| | | | |
|---|---|---|---|
| 5,969,485 | A | 10/1999 | Hunt |
| 7,242,152 | B2 | 7/2007 | Dowling et al. |
| 7,306,341 | B2 | 12/2007 | Chang |
| 7,401,934 | B2 | 7/2008 | Hunt |
| 7,502,034 | B2 | 3/2009 | Chemel et al. |
| 8,324,826 | B2 | 12/2012 | Verberkt et al. |
| 8,938,468 | B2 | 1/2015 | Morgan et al. |
| 9,167,672 | B2 | 10/2015 | Engelen et al. |
| 9,400,856 | B2 | 7/2016 | Striegel |
| 9,677,755 | B1 | 6/2017 | Linnell et al. |
| 2004/0252486 | A1 | 12/2004 | Krause |
| 2005/0275626 | A1 | 12/2005 | Mueller et al. |
| 2009/0105856 | A1 | 4/2009 | Kurt et al. |
| 2011/0035404 | A1 | 2/2011 | Morgan et al. |
| 2013/0187919 | A1 | 7/2013 | Medioni et al. |
| 2015/0262405 | A1* | 9/2015 | Black .................. G06T 7/97 345/420 |
| 2015/0287229 | A1* | 10/2015 | Sela .................. G06T 13/40 345/419 |
| 2019/0101377 | A1* | 4/2019 | White .................. H04N 5/33 |
| 2019/0340306 | A1* | 11/2019 | Harrison .................. G06N 3/08 |

OTHER PUBLICATIONS

Non Patent Literature, "Articulated Structure and Its Kinematic Chain From Motion with Extension to Non-Rigid Parts", website: http://people.inf.ethz.ch/pomarc/pubs/YanAMDO06subm.pdf, webpage available at least as early as Sep. 17, 2018.

Koen Buys (KU Leuven) "People Pose Detection" May 10, 2013, 35 page presentation.

Buys, et al., "An adaptable system for RGB-D based human body detection and pose estimation" Journal of Visual Communication and Image Representation, Jan. 2014, webpage: https://dl.acm.org/doi/10.1016/j.jvcir.2013.03.011.

Wandt, et al. "A Kinematic Chain Space for Monocular Motion Capture", webpage: https://arxiv.org/pdf/1702.00186.pdf, Feb. 2, 2017.

Lin, et al, "A Vision-based Scheme for Kinematic Model Construction of Re-configurable Modular Robots", webpage: https://arxiv.org/pdf/1703.03941.pdf, Mar. 11, 2017.

Non Patent Literature, Wang, et al., "Designing an Adaptive Lighting Control System for Smart Buildings and Homes", Arizona State University, Apr. 2015.

* cited by examiner

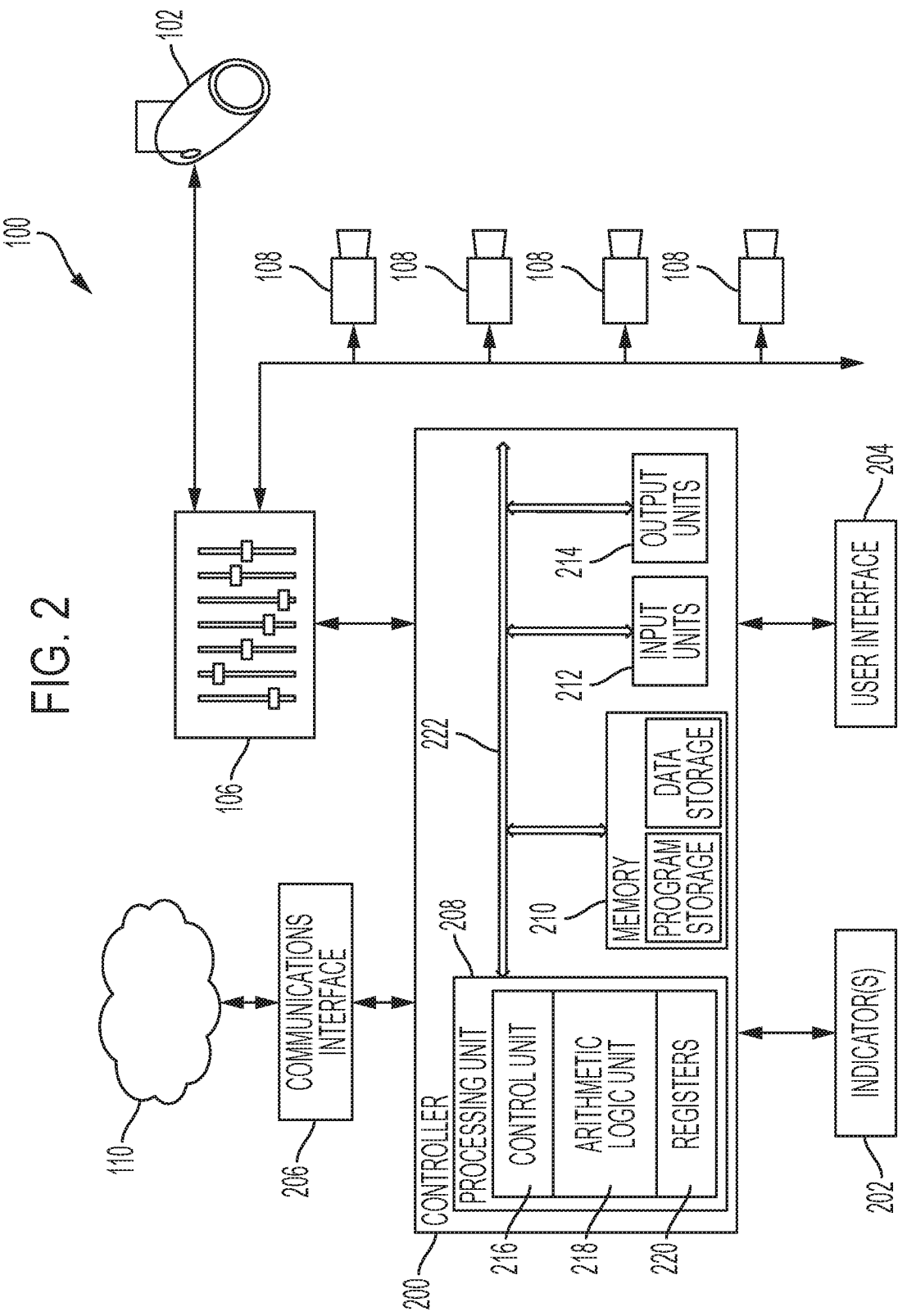

THREE-DIMENSIONAL RECONSTRUCTION OF AUTOMATED LIGHTING FIXTURES AND THEIR OPERATIONAL CAPABILITIES

CROSS-REFERENCE TO RELATED APPLICATIONS

This application claims the benefit of U.S. Provisional Patent Application No. 62/777,481, filed on Dec. 10, 2018, which is hereby incorporated by reference in its entirety.

FIELD

Embodiments described herein relate to determining operational capabilities of a lighting fixture.

SUMMARY

Every lighting fixture has particular operational capabilities including both kinematic capabilities and lighting capabilities. Kinematic capabilities include panning and tilting on multiple axes to direct the beam(s) of light produced by the lighting fixture, zooming, focusing, utilizing go-between or go-before optics templates ("gobos"), narrowing an iris, opening and closing shutters, and the like. The lighting capabilities include altering the power (e.g., using pulse width modulation) to the light source (e.g., one or more light emitting diodes) to change lighting features such as brightness, duration, color, and the like. Based on the various kinematic and/or lighting capabilities, a lighting fixture may be configured in a variety of operational states. Because of the number of light control operations and light manipulation accessories that can be placed on a lighting fixture, combined with the number of varying lighting fixture constructions, fully understanding the operational capabilities of any one particular lighting fixture is difficult.

Currently, a user must have in-depth knowledge of a particular lighting fixture to assess the lighting fixture's operational capabilities. This knowledge is typically gained through experience with the particular lighting fixture through either testing or previous use in lighting tasks. Visualizing an entire arrangement of lighting fixtures capable of accomplishing particular lighting tasks, therefore, requires a very experienced lighting technician. Even with an experienced technician, a good deal of guesswork is necessary to achieve a satisfactory lighting result for a lighting task. A guessing and checking set up technique for a lighting fixture arrangement uses valuable time and energy. Often, the event for which the lighting fixture arrangement is being set up also has a firm deadline, making inefficiencies in set up undesirable.

Further, requiring a person of exceptional experience and skill to produce this information would be costly and inconvenient. Even employing several experienced users to analyze and log the operational capabilities of lighting fixtures would be costly. Also, human error would result in the data not being entirely reliable. As a result, it is likely potential lighting effects would be missed or erroneously identified.

Although a particular lighting fixture arrangement may be suitable for a single lighting effect, the particular lighting fixture arrangement may make other lighting effects impossible. The user, therefore, must keep track of the capabilities of many lighting fixtures as well as many desired lighting effects. Using existing methodologies, it is unlikely that the best possible lighting fixture arrangement is discovered and utilized in the limited time for set up before an event. Rather, a satisfactory but less than ideal lighting fixture arrangement is settled upon even when improvements could be available.

More variables are introduced if a user considers potential lighting fixtures that are not present at the current venue but could be obtained to be used at the current venue. This consideration opens up the possibility for a more optimal lighting arrangement, but also forces the user to then consider many more variables with regard to the operational capabilities of countless hypothetical lighting arrangements.

Additionally, other hypothetical lighting effects could be produced if enough data about all the possible lighting fixtures and their respective operational capabilities were known. These hypothetical lighting effects could be presented to the stage director or concert organizer as lighting options for the event, thereby allowing more creative freedom for the event. No matter how experienced, a user of the lighting fixtures cannot comprehend and convey all the possibilities of all the potential lighting fixture arrangements available at a given venue.

To address the above concerns, systems and methods described herein provide for rendering of hypothetical lighting fixture arrangements in a virtual environment. Such a virtual environment could be static or interactive. The virtual environment helps visualize potential lighting effects with regard to any particular lighting fixture arrangement. Further, the virtual environment helps identify appropriate lighting fixture arrangements for a desired lighting effect. The virtual environment also helps the user create and evaluate various lighting compositions. Operational capabilities of lighting fixtures are identified and cataloged without requiring the knowledge and/or time of a skilled lighting technician would be desirable. The data related to each lighting fixture can be added to a database for use with, for instance, the virtual environment.

Methods described herein provide for generating a three-dimensional model of a lighting fixture. The methods include receiving, by an electronic processor, first scanning data related to the lighting fixture while the light fixture is in a first configuration, adjusting the configuration of the lighting fixture, receiving, by the electronic processor, second scanning data related to the lighting fixture while the lighting fixture is in a second configuration, comparing, by the electronic processor, the first scanning data and the second scanning data, performing, by the electronic processor, three-dimensional mesh reconstruction based on the first scanning data and the second scanning data, and generating, by the electronic processor, the three-dimensional model based on the first configuration of the lighting fixture and the second configuration of the lighting fixture representing an operational capability of the lighting fixture.

In some embodiments, initial knowledge of the capabilities is known to the system. This initial knowledge is used to bootstrap the process. In some embodiments, an expert user guides the system through the process steps of the methods disclosed herein.

In some embodiments, the methods include adjusting the configuration of the lighting fixture includes panning the lighting fixture, tilting the lighting fixture, zooming the lighting fixture, moving a shutter of the lighting fixture, moving an iris of the lighting fixture, adding a gobo in the lighting fixture, and/or rotating a gobo in the lighting fixture.

In some embodiments, the methods include approximating, by the electronic processor or manually, a pan axis of the lighting fixture based on the comparing of the first scanning data and the second scanning data, and/or approximating, by the electronic processor or manually, a tilt axis of the lighting fixture based on the comparing of the first scanning data and the second scanning data.

In some embodiments, the adjusting the configuration of the lighting fixture includes adjusting a color of light produced by the lighting fixture, adjusting a brightness of light produced by the lighting fixture, adjusting an overall shape of light produced by the lighting fixture, and/or adjusting a focus of a light produced by the lighting fixture.

In some embodiments, the adjusting the configuration of the lighting fixture includes transmitting, by the electronic processor, drive signals to the lighting fixture to control of an actuator associated with the lighting fixture.

In some embodiments, the methods include transmitting, by the electronic processor, drive signals to one or more cameras configured to capture the first scanning data and the second scanning data.

In some embodiments, the first scanning data and the second scanning data include one of images of the lighting fixture and images of light projected on a surface by the lighting fixture.

In some embodiments, the methods include receiving, by the electronic processor, a selected operation of the lighting fixture, determining, by the electronic processor, a limitation of operation of the lighting fixture based on the three-dimensional model, and indicating, on a user interface, the limitation of the operation of the lighting fixture in response to the selected operation of the lighting fixture.

In some embodiments, the methods include generating, by the electronic processor, one or more drive signals for an actuator associated with the lighting fixture to control the lighting fixture in accordance with the operational capability.

Systems described herein provide for generating a three-dimensional model of a lighting fixture. The systems include a controller that includes an electronic processor coupled to a memory. The memory is configured to store instructions that when executed by the electronic processor configure the controller to receive first scanning data related to a lighting fixture while the lighting fixture is in a first configuration, receive second scanning data related to the lighting fixture after an adjustment to the lighting fixture to a second configuration, compare the first scanning data and the second scanning data, perform three-dimensional mesh reconstruction based on the first scanning data and the second scanning data and generate the three-dimensional model based on the first configuration of the lighting fixture and the second configuration of the lighting fixture representing an operational capability of the lighting fixture.

In some embodiments, the controller is further configured to pan the lighting fixture, tilt the lighting fixture, zoom the lighting fixture, move a shutter of the lighting fixture, move an iris of the lighting fixture, add a gobo in the lighting fixture, and/or rotate the gobo in the lighting fixture.

In some embodiments, the controller is further configured to approximate a pan axis of the lighting fixture based on the comparison of the first scanning data and the second scanning data, and/or approximate a tilt axis of the lighting fixture based on the comparison of the first scanning data and the second scanning data.

In some embodiments, the controller is further configured to approximate other kinematic axes (in addition to or alternatively to the pan and tilt axes) of the lighting fixture based on the comparison of scanning data.

In some embodiments, the adjustment to the lighting fixture includes a color adjustment, a brightness adjustment, a shape of the light produced adjustment, and/or a focus adjustment.

In some embodiments, the controller is further configured to transmit drive signals to the lighting fixture to control an actuator associated with the lighting fixture.

In some embodiments, the controller is further configured to transmit drive signals to one or more cameras configured to capture the first scanning data and the second scanning data.

In some embodiments, the first scanning data and the second scanning data include one of images of the lighting fixture and images of light projected on a surface by the lighting fixture.

In some embodiments, the controller is further configured to receive a selected operation of the lighting fixture, determine a limitation of operation of the lighting fixture based on the three-dimensional model, and indicate the limitation of the operation of the lighting fixture in response to the selected operation of the lighting fixture.

Computer readable media described herein have stored thereon a program for generating a three-dimensional model of a lighting fixture. The program is executable by an electronic processor to configure the electronic processor to receive first scanning data related to the lighting fixture while the light fixture is in a first configuration, receive second scanning data related to the lighting fixture while the lighting fixture is in a second configuration, compare the first scanning data and the second scanning data, perform three-dimensional mesh reconstruction based on the first scanning data and the second scanning data, and generate the three-dimensional model based on the first configuration of the lighting fixture and the second configuration of the lighting fixture representing an operational capability of the lighting fixture.

In some embodiments, the program further configures the electronic processor to adjust a pan, a tilt, a zoom, a shutter, an iris, and/or a gobo of the lighting fixture.

In some embodiments, the program further configures the electronic processor to approximate a pan axis of the lighting fixture based on the comparison of the first scanning data and the second scanning data, and/or approximate a tilt axis of the lighting fixture based on the comparison of the first scanning data and the second scanning data.

In some embodiments, the program further configures the electronic processor to adjust a color of light produced by the lighting fixture, a brightness of light produced by the lighting fixture, an overall shape of light produced by the lighting fixture, and/or a focus of a light produced by the lighting fixture.

In some embodiments, the program further configures the electronic processor to transmit drive signals to the lighting fixture to control an actuator associated with the lighting fixture.

In some embodiments, the program further configures the electronic processor to transmit drive signals to one or more cameras configured to capture the first scanning data and the second scanning data.

In some embodiments, the first scanning data and the second scanning data include one of images of the lighting fixture and images of light projected on a surface by the lighting fixture.

In some embodiments, the program further configures the electronic processor to receive a selected operation of the lighting fixture, determine a limitation of operation of the lighting fixture based on the three-dimensional model, and indicate, on a user interface, the limitation of the operation of the lighting fixture in response to the selected operation of the lighting fixture.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 2 illustrates a controller for the system of FIG. 1.

DETAILED DESCRIPTION

Measuring and logging the operational capabilities of a given light fixture is time consuming, tedious, and prone to mistakes and inaccuracy when done by hand. Additionally, proper analysis of the operational capabilities of a given lighting fixture must be done by someone very familiar with the given lighting fixture or with substantially similar lighting fixtures. To address these and other technical problems associated with measuring, logging, and using the operational capabilities of a lighting fixture, embodiments described herein scan the given lighting fixture and log the scan data in a database to create a digital model for the lighting fixture.

Figure 1:
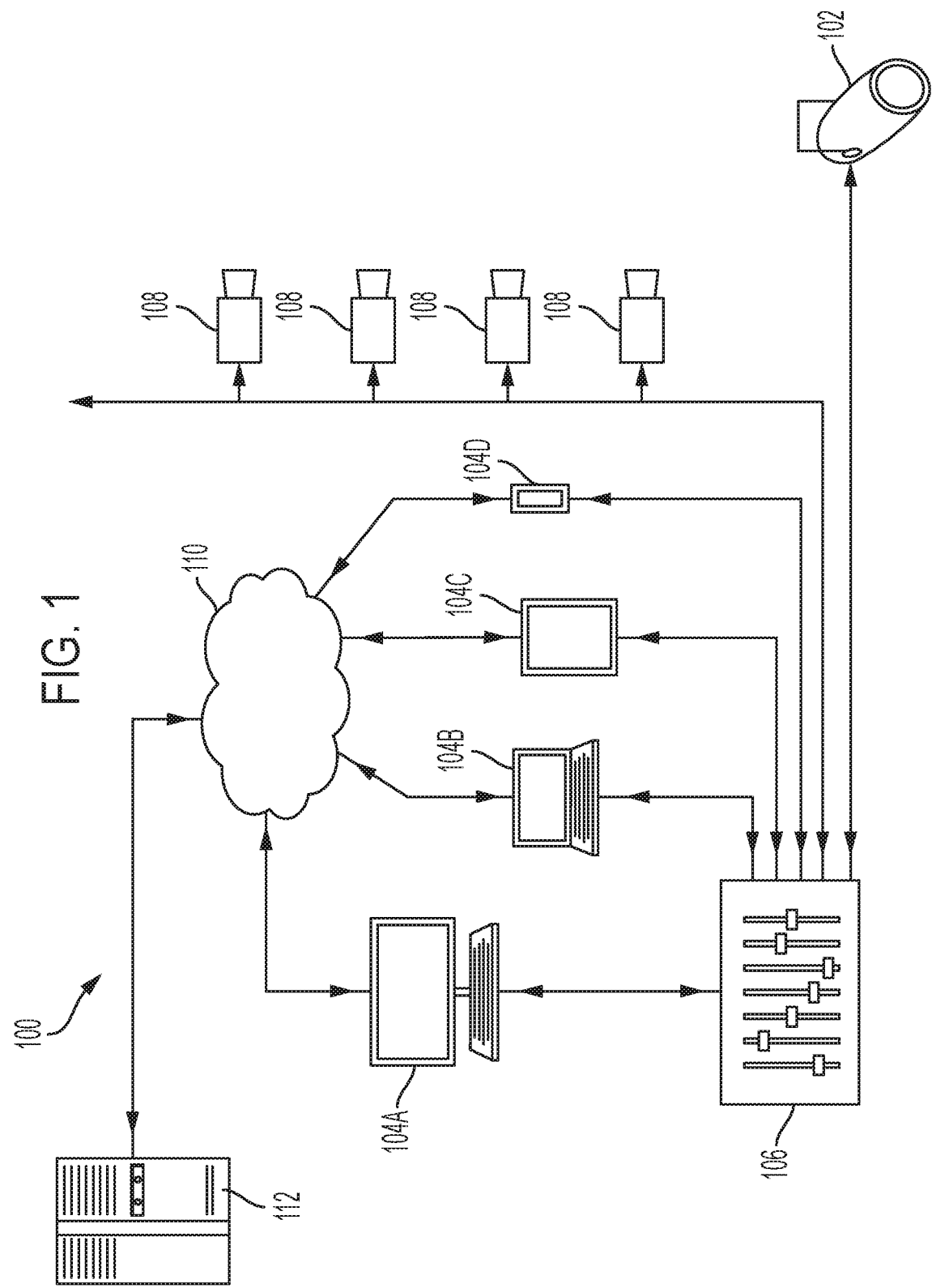
FIG. 1 illustrates a system to analyze a lighting fixture and log information for later access with a user device.

For example, FIG. 1 illustrates a system 100 for analyzing a lighting fixture 102. The system 100 includes a user input device 104A-104D, a control board or control panel 106, a lighting fixture 102, one or more cameras 108, a network 110, and a server-side mainframe computer or server 112. The user input device 104A-104D includes, for example, a personal or desktop computer 104A, a laptop computer 104B, a tablet computer 104C, or a mobile phone (e.g., a smart phone) 104D. Other user input devices 104A-104D include, for example, an augmented reality headset or glasses. The camera 108 may be integrated with the user input device 104, such as the camera of the mobile phone 104D, or the cameras 108 may be entirely separate from the user input device 104A-104D. Although cameras 108 are being described specifically herein, the system 100 (and/or 100A below) may utilize one or more cameras, stereo cameras, LIDAR, projected light depth cameras, or the like.

The user input device 104A-104D is configured to communicatively connect to the server 112 through the network 110 and provide information to, or receive information from, the server 112 related to the control or operation of the system 100. The user input device 104A-104D is also configured to communicatively connect to the control board 106 to provide information to, or receive information from, the control board 106. The connections between the user input device 104 and the control board 106 or network 110 are, for example, wired connections, wireless connections, or a combination of wireless and wired connections. Similarly, the connections between the server 112 and the network 110, the control board 106 and the lighting fixtures 102, or the control board 106 and the cameras 108 are wired connections, wireless connections, or a combination of wireless and wired connections.

The network 110 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 110 is a cellular network, such as, for example, a Global System for Mobile Communications ("GSM") network, a General Packet Radio Service ("GPRS") network, a Code Division Multiple Access ("CDMA") network, an Evolution-Data Optimized ("EV- DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 1A:
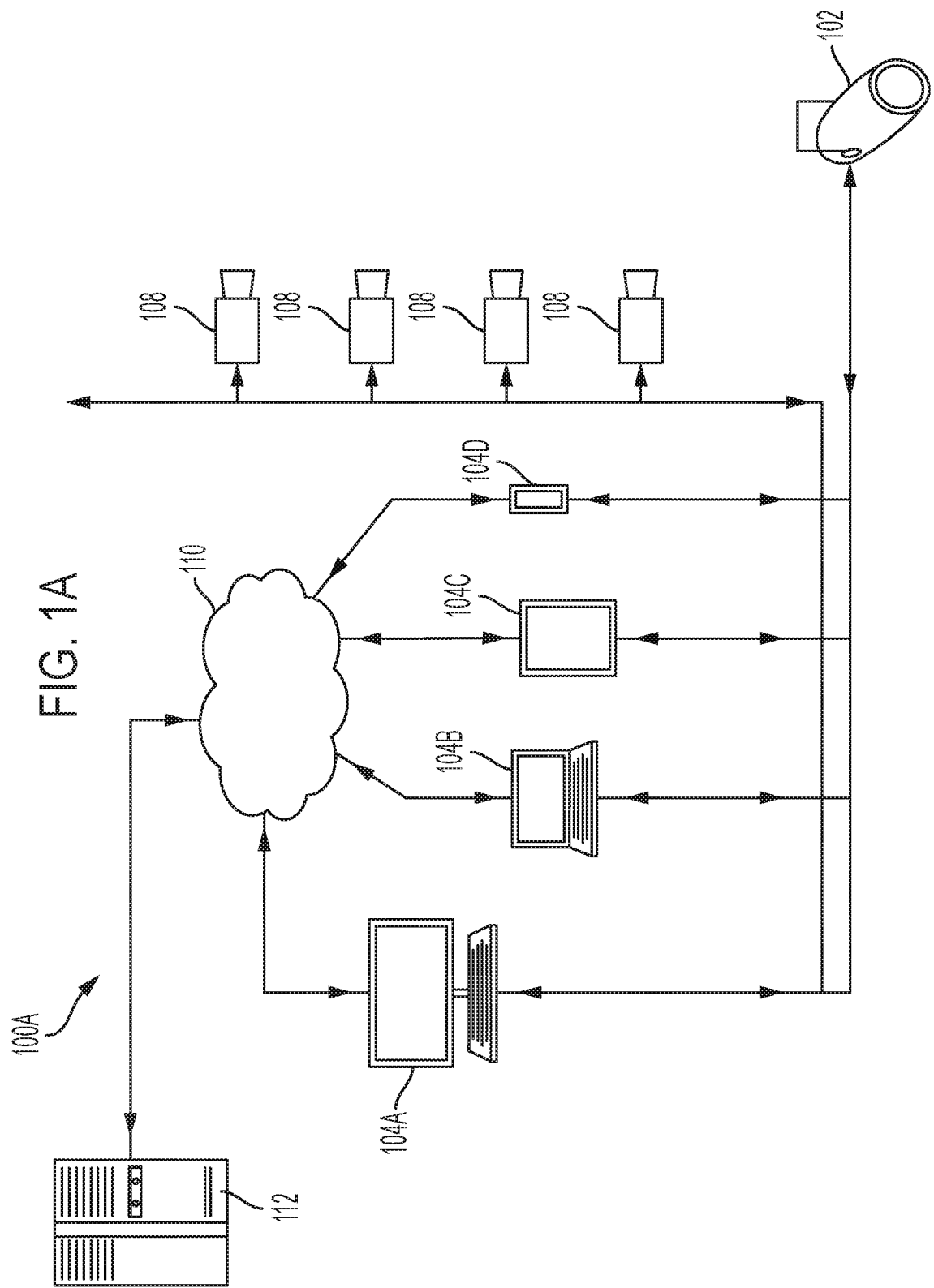
FIG. 1A illustrates an alternative system to analyze a lighting fixture and log information for later access with a user device.

FIG. 1A illustrates an alternative system 100A for analyzing a lighting fixture 102. The alternative system 100A is identical to the system 100, except the control board or control panel 106 is removed. As such, the user input device 104A-104D is configured to communicatively connect to the lighting fixture 102 and to the cameras 108. The connections between the user input device 104A-104D and the lighting fixture 102 and the connections between the user input device 104A-104D and the cameras 108 are wired connections, wireless connections, or a combination of wireless and wired connections.

FIG. 2 illustrates a controller 200 for the system 100. The controller 200 is electrically and/or communicatively connected to a variety of modules or components of the system 100. For example, the illustrated controller 200 is connected to one or more indicators 202 (e.g., LEDs, a liquid crystal display ["LCD"], etc.), a user input or user interface 204 (e.g., a user interface of the user input device 104A-104D in FIG. 1), and a communications interface 206. The controller 200 is also connected to the control board 106. The communications interface 206 is connected to the network 110 to enable the controller 200 to communicate with the server 112. The controller 200 includes combinations of hardware and software that are operable to, among other things, control the operation of the system 100, control the operation of the lighting fixture 102, control the operation of the cameras 108, receive one or more signals from the cameras 108, communicate over the network 110, communicate with the control board 106, receive input from a user via the user interface 204, provide information to a user via the indicators 202, etc. In some embodiments, the indicators 202 and the user interface 204 is integrated together in the form of, for instance, a touch-screen.

In the embodiment illustrated in FIG. 2, the controller 200 is associated with the user input device 104A-104D. As a result, the controller 200 is illustrated in FIG. 2 as being connected to the control board 106 which is, in turn, connected to the lighting fixture 102 and the cameras 108. In other embodiments, the controller 200 is included within the control board 106, and, for example, the controller 200 can provide control signals directly to the lighting fixture 102 and the cameras 108. In other embodiments, the controller 200 is associated with the server 112 and communicates through the network 110 to provide control signals to the control board 106, the lighting fixture 102, and the cameras 108.

The controller 200 includes a plurality of electrical and electronic components that provide power, operational control, and protection to the components and modules within the controller 200 and/or the system 100. For example, the controller 200 includes, among other things, a processing unit 208 (e.g., an electronic processor, a microprocessor, a microcontroller, or another suitable programmable device), a memory 210, input units 212, and output units 214. The processing unit 208 includes, among other things, a control unit 216, an arithmetic logic unit ("ALU") 218, and a plurality of registers 220 (shown as a group of registers in FIG. 2), and is implemented using a known computer architecture (e.g., a modified Harvard architecture, a von Neumann architecture, etc.). The processing unit 208, the memory 210, the input units 212, and the output units 214, as well as the various modules or circuits connected to the controller 200 are connected by one or more control and/or data buses (e.g., common bus 222). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 208 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. Software included in the implementation of the system 100 and controller 200 can be stored in the memory 210 of the controller 200. The software includes, for example, firmware, one or more applications, program data, filters, rules, one or more program modules, and other executable instructions. The controller 200 is configured to retrieve from the memory 210 and execute, among other things, instructions related to the control processes and methods described herein. In other embodiments, the controller 200 includes additional, fewer, or different components.

The user interface 204 is included to provide user control of the system 100, the lighting fixture 102, and/or the camera 108. The user interface 204 is operably coupled to the controller 200 to control, for example, drive signals provided to the lighting fixture 102 and/or drive signals provided to the camera 108. The user interface 204 can include any combination of digital and analog input devices required to achieve a desired level of control for the system 100. For example, the user interface 204 can include a computer having a display and input devices, a touch-screen display, a plurality of knobs, dials, switches, buttons, faders, or the like. In the embodiment illustrated in FIG. 2, the user interface 204 is separate from the control board 106. In other embodiments, the user interface 204 is included in the control board 106.

The controller 200 is configured to work in combination with the control board 106 to provide direct control or drive signals to the lighting fixture 102 and/or the cameras 108. As described above, in some embodiments, the controller 200 is configured to provide direct drive signals to the lighting fixture 102 and/or the cameras 108 without separately interacting with the control board 106 (e.g., the control board 106 includes the controller 200). The direct drive signals that are provided to the lighting fixture 102 and/or the cameras 108 are provided, for example, based on a user input received by the controller 200 from the user interface 204. The controller 200 is also configured to receive one or more signals from the cameras 108 related to image or scan data.

Figure 2A:
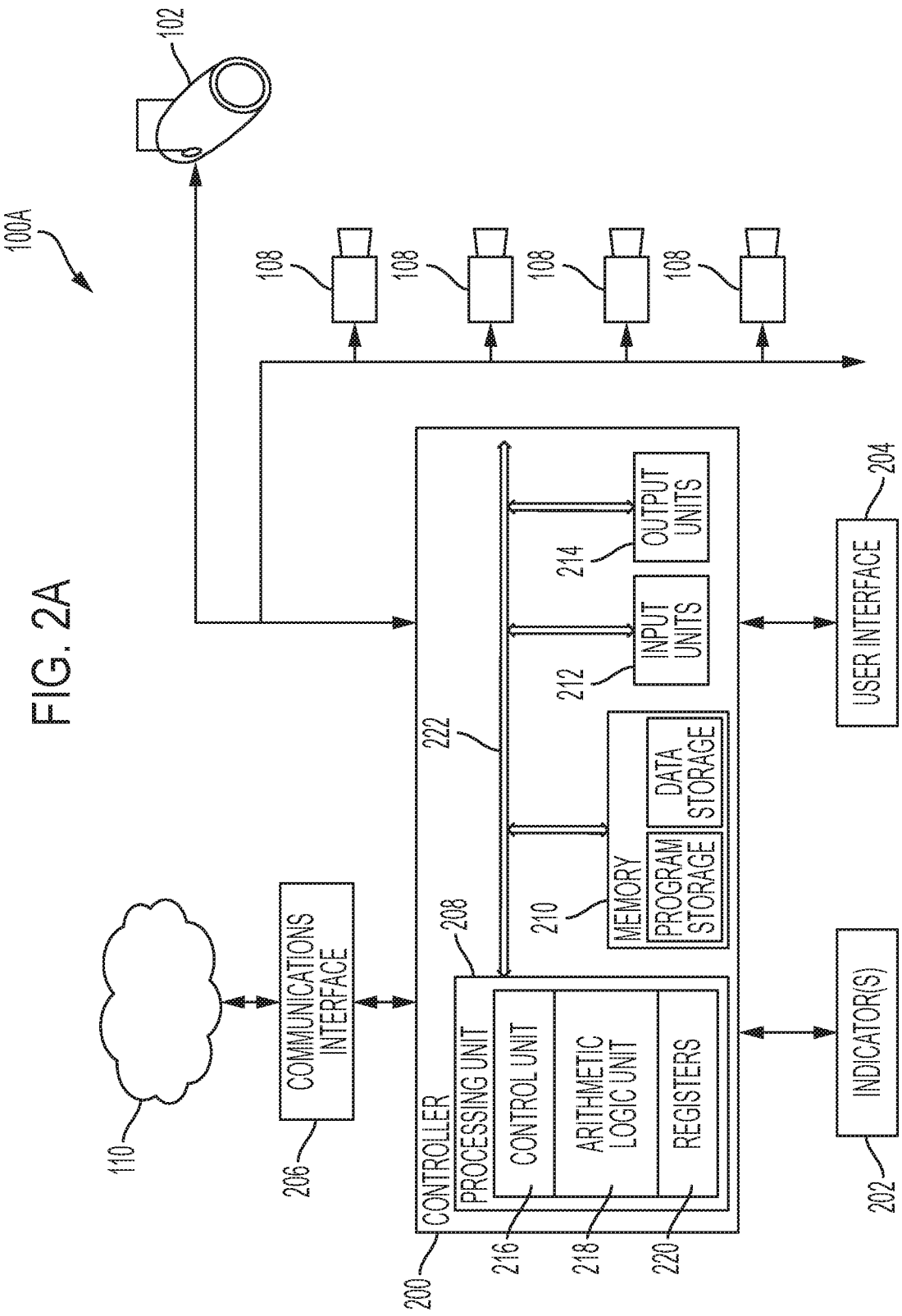
FIG. 2A illustrates a controller for the system of FIG. 1A.

As shown in FIG. 2A and described above, the system 100A includes the controller 200 configured to work without the control board 106, such that the controller 200 is configured to provide signals to the lighting fixture 102 and/or the cameras 108 and to receive one or more signals from the cameras 108 related to image or scan data.

Figure 3:
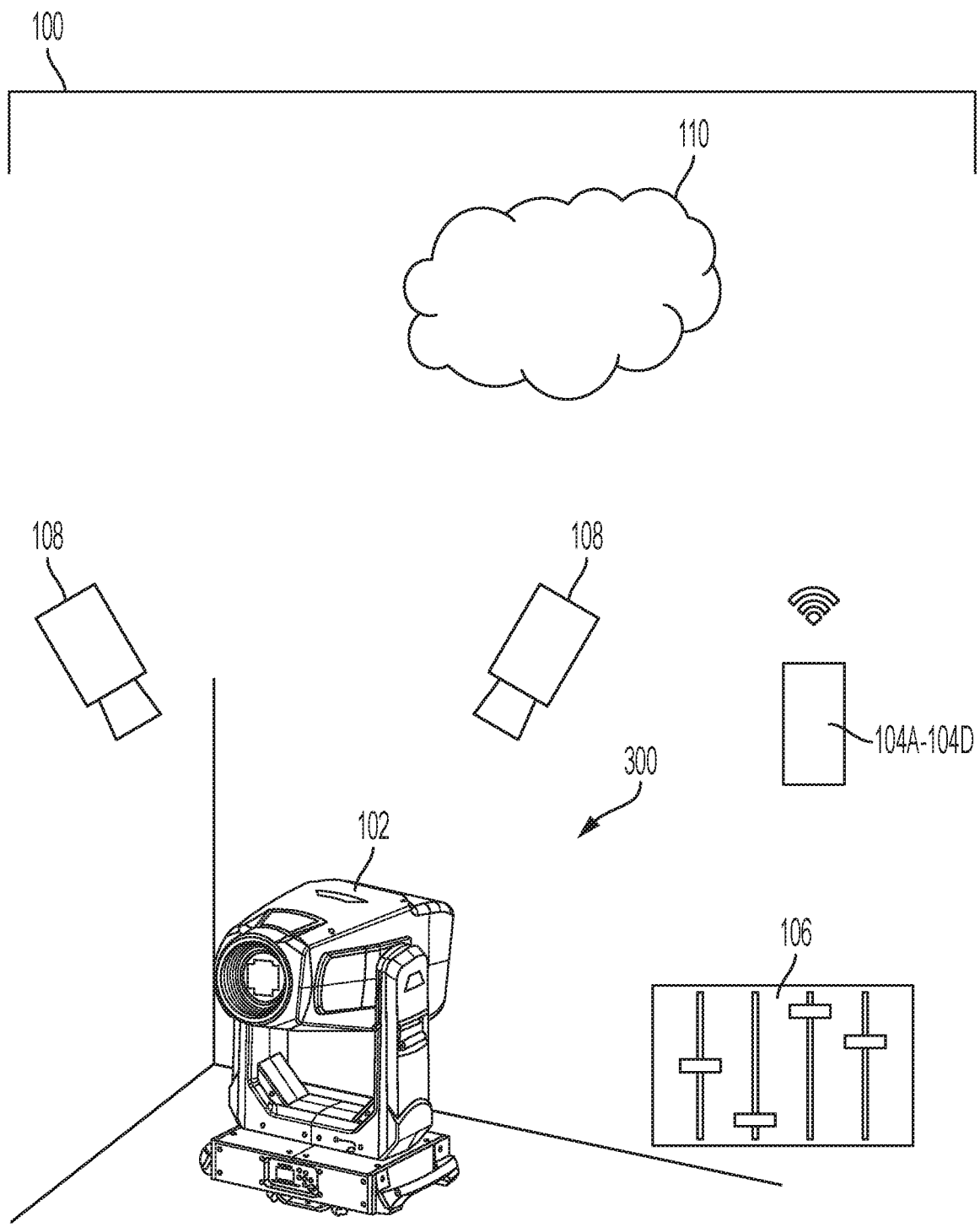
FIG. 3 illustrates cameras and a lighting fixture in a scanning arrangement for the system of FIG. 1.
Figure 4:
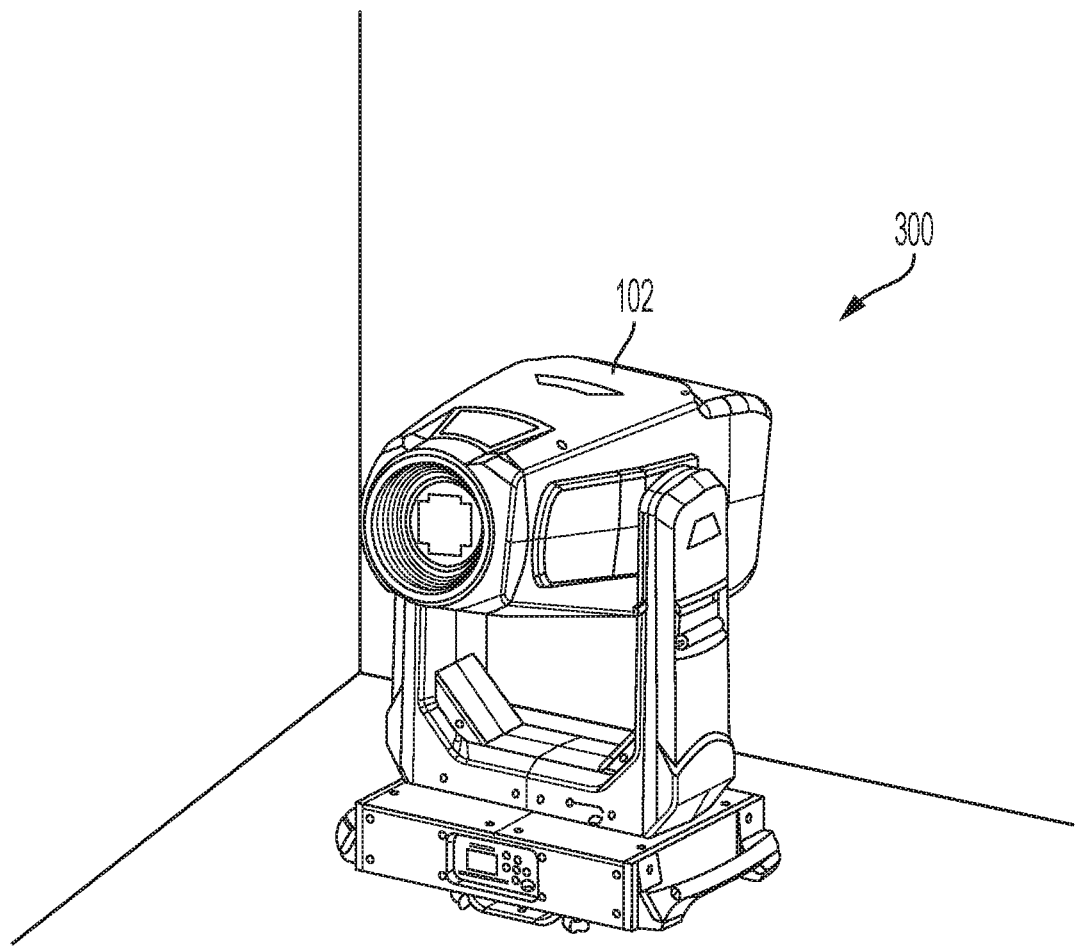
FIG. 4 illustrates a perspective view of the lighting fixture of FIGS. 3 and 3A.
Figure 5:
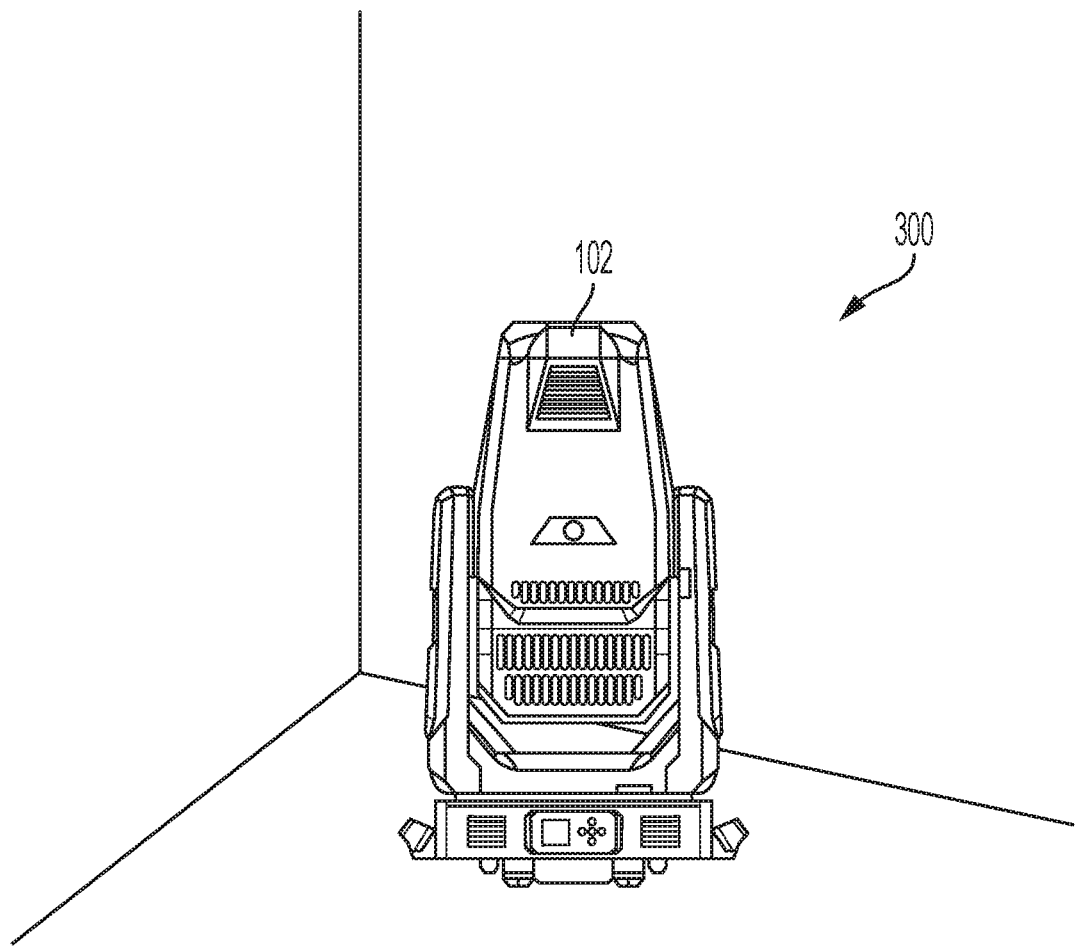
FIG. 5 illustrates a front elevation view of the lighting fixture of FIG. 4 in a home position.
Figure 6:
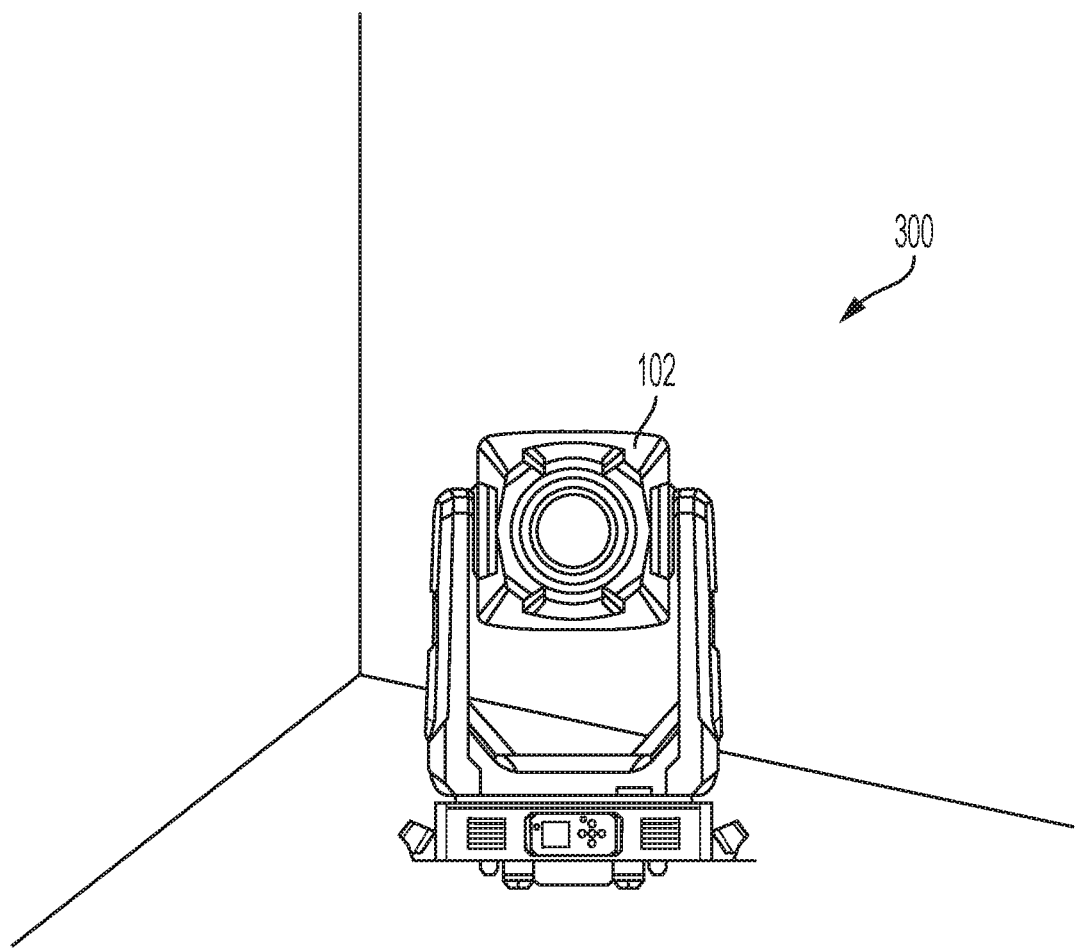
FIG. 6 illustrates a front elevation view of the lighting fixture of FIG. 4 in a position different from the home position.
Figure 7:
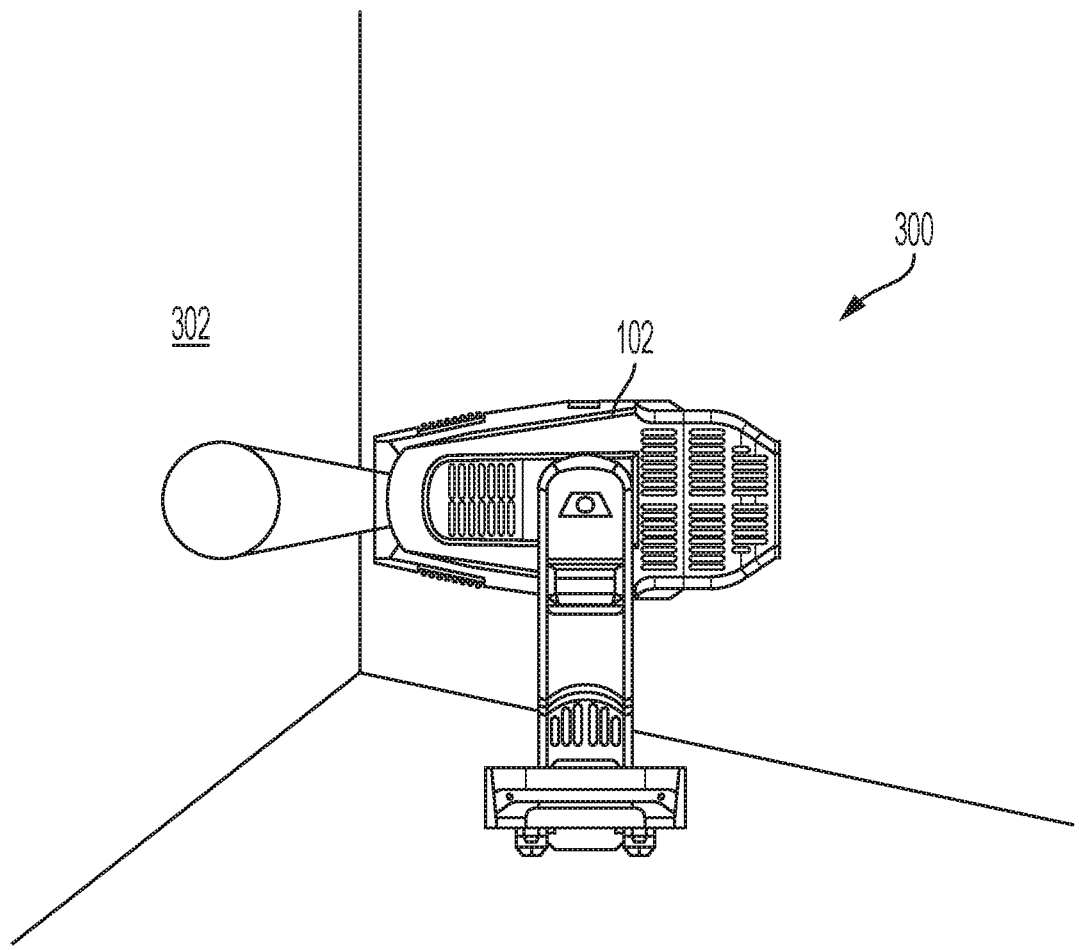
FIG. 7 illustrates a side elevation view of the lighting fixture of FIG. 4 projecting light onto a surface of an enclosure.

FIG. 3 illustrates the control board 106, the lighting fixture 102, the cameras 108, and the user input device 104A-104D of the system 100 in a scanning arrangement. The lighting fixture 102 is disposed in a scanning enclosure 300. The scanning enclosure 300 provides a known background against which the lighting fixture 102 is scanned by the cameras 108. The scanning enclosure 300 may also receive light from the lighting fixture 102 on one or more light receiving surfaces 302 (see FIG. 7), which may also be scanned by the cameras 108. The user input device 104A-104D and/or the control board 106 directs the lighting fixture 102 to move to various positions. For example, FIG. 4 illustrates the light fixture 102 in a first position (e.g., a forward-facing position). FIG. 5 illustrates the light fixture 102 in a second position (e.g., a home position). FIG. 6 illustrates the light fixture 102 in a third position (e.g., a non-home position). FIG. 7 illustrates the light fixture 102 in a fourth position (e.g., a left-facing position) and projecting light onto the surface 302 of the enclosure 300.

Figure 3A:
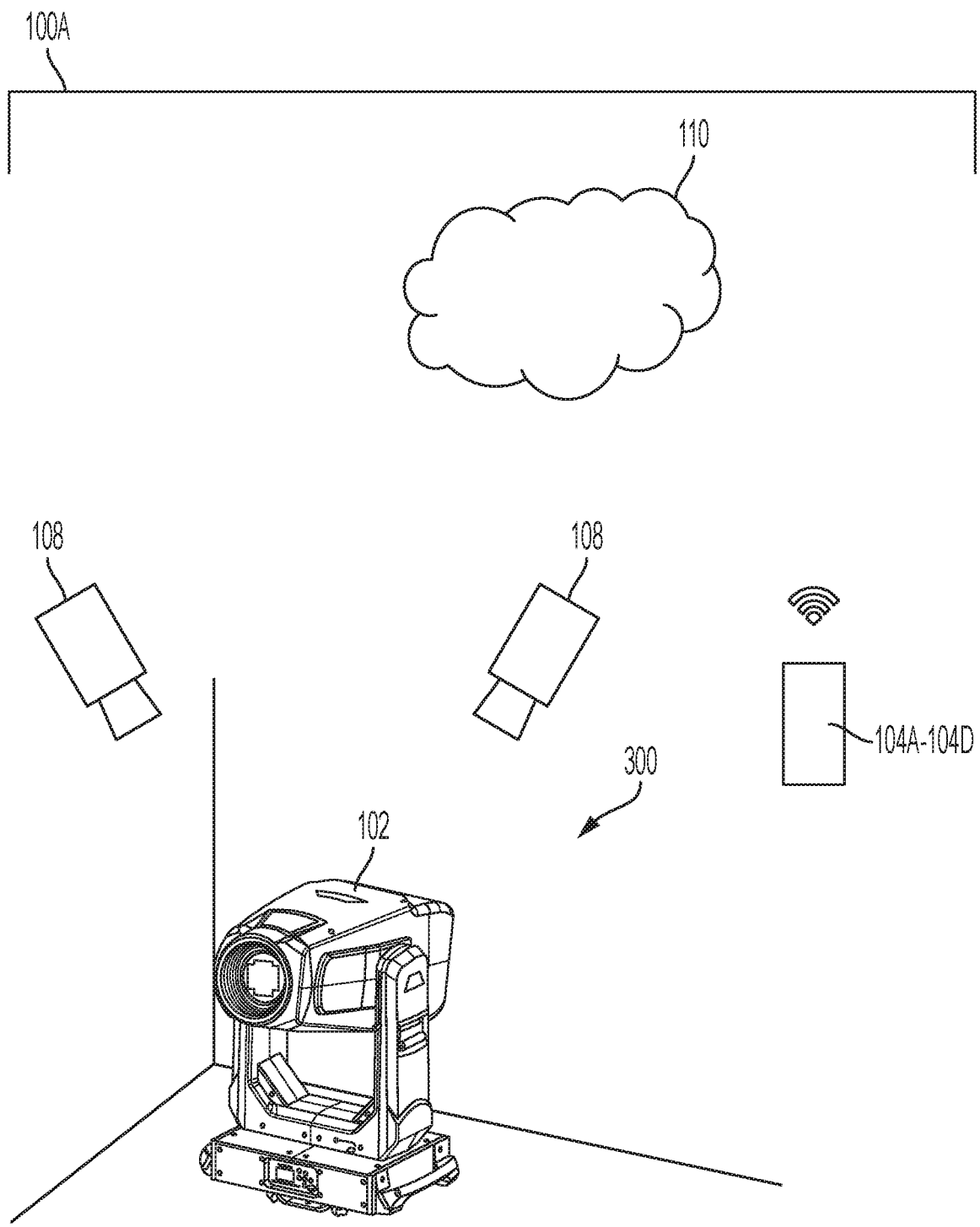
FIG. 3A illustrates cameras and a lighting fixture in a scanning arrangement for the system of FIG. 1A.

FIG. 3A illustrates the system 100A in a scanning arrangement. As described above, the system 100A removes the control board 106, and the user input device 104A-104D is configured to directly communicate with the lighting fixture 102 and the cameras 108.

The cameras 108 capture image or scan data of the lighting fixture 102 at the various positions, which is then correlated with the respective lighting fixture position settings information. The scan data is processed and interpreted through programming such as, for instance, a simultaneous localization and mapping ("SLAM") program, an edge detection algorithm for detecting edges (e.g., the extent) of the light fixture 102, etc. Other embodiments may utilize structured light, a light-field, light detection and ranging ("LIDAR"), or the like. Based on the scan data, the controller 200 generates a point cloud. The controller 200 performs three-dimensional mesh reconstruction or determines three-dimensional mesh reconstruction parameters using point could reconstruction techniques to account for surface smoothness, visibility, volumetric smoothness, geometric primitives, global regularity, and other point cloud reconstruction factors. The controller 200 uses the three-dimensional mesh reconstruction or parameters for mesh segmentation (e.g., using an object segmentation algorithm such as a conditional random field objective function) and background subtraction. The controller 200 then generates a digital model of the lighting fixture 102 (e.g., using a marching cubes algorithm, a marching tetrahedrons algorithm, the Bloomenthal Polygonizer, or another algorithm for selecting polygons representing portions of the model). The digital model can indicate to a user the operational capabilities of the lighting fixture 102. The operational capabilities can be displayed (e.g., in the user interface 204) as, for instance, one or more tables, one or more graphs or charts, a three-dimensional rendering of the lighting fixture and/or the light patterns produced by the lighting fixture, and the like.

Additional examples of known methods of scanning objects and recording the scan data can be found in U.S. Patent Application Publication No. 2012/0306876, published on Dec. 6, 2012, and U.S. Patent Application Publication No. 2016/0071318, published on Mar. 10, 2016, the entire contents of which are hereby incorporated by reference.

In some embodiments, the cameras 108 capture only images of the light receiving surface 302 of the enclosure 300 as the light is projected on the receiving surface 302. Data gathered by the cameras 108 of the light projected on the light receiving surface 302 can be evaluated to determine where the light falls on the color spectrum (e.g., with respect to the CIE 1931 color space), the intensity of the light at various locations on the light receiving surface 302, and the like.

Figure 8:
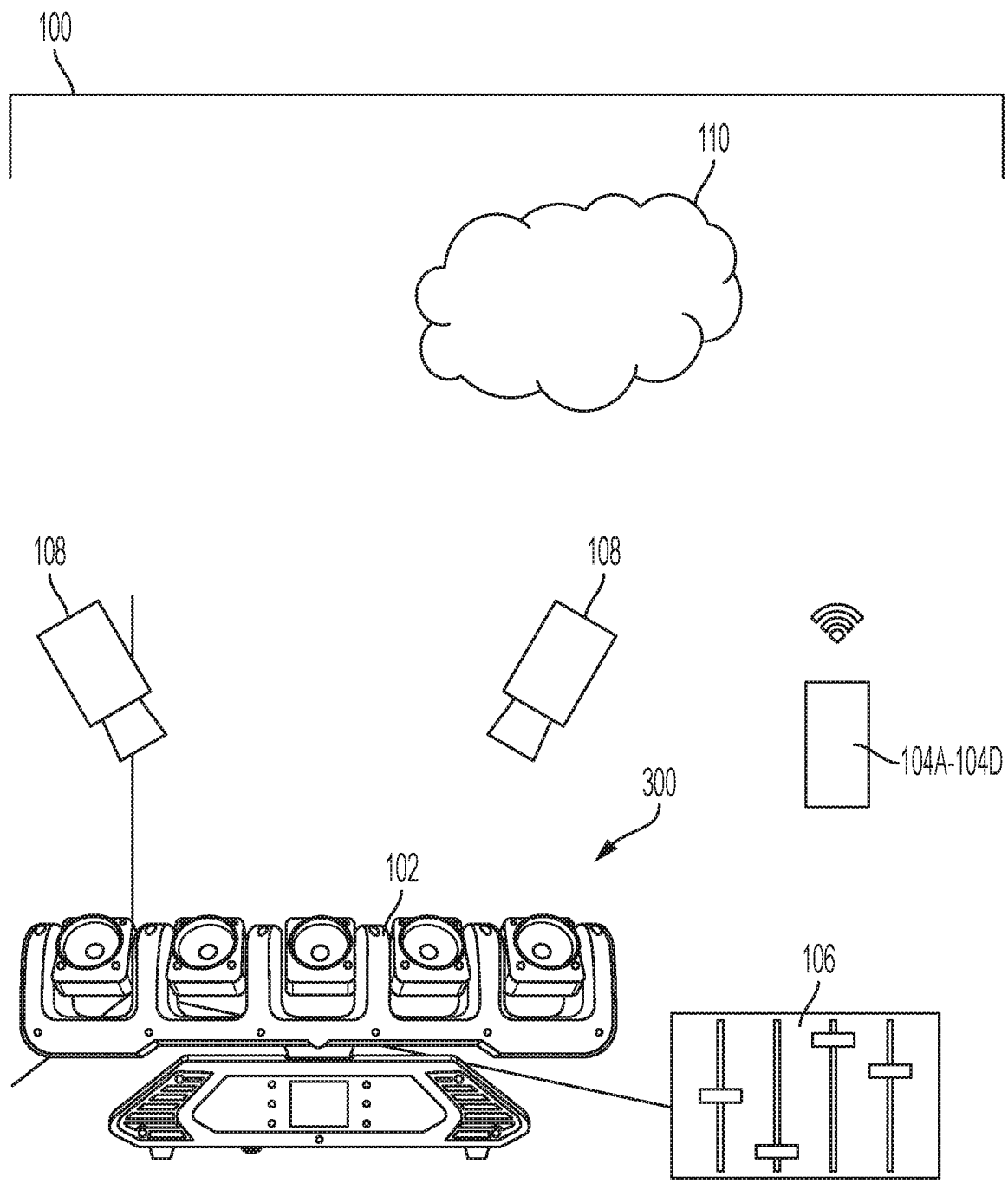
FIG. 8 illustrates cameras and another lighting fixture in a scanning arrangement for the system of FIG. 1.
Figure 8A:
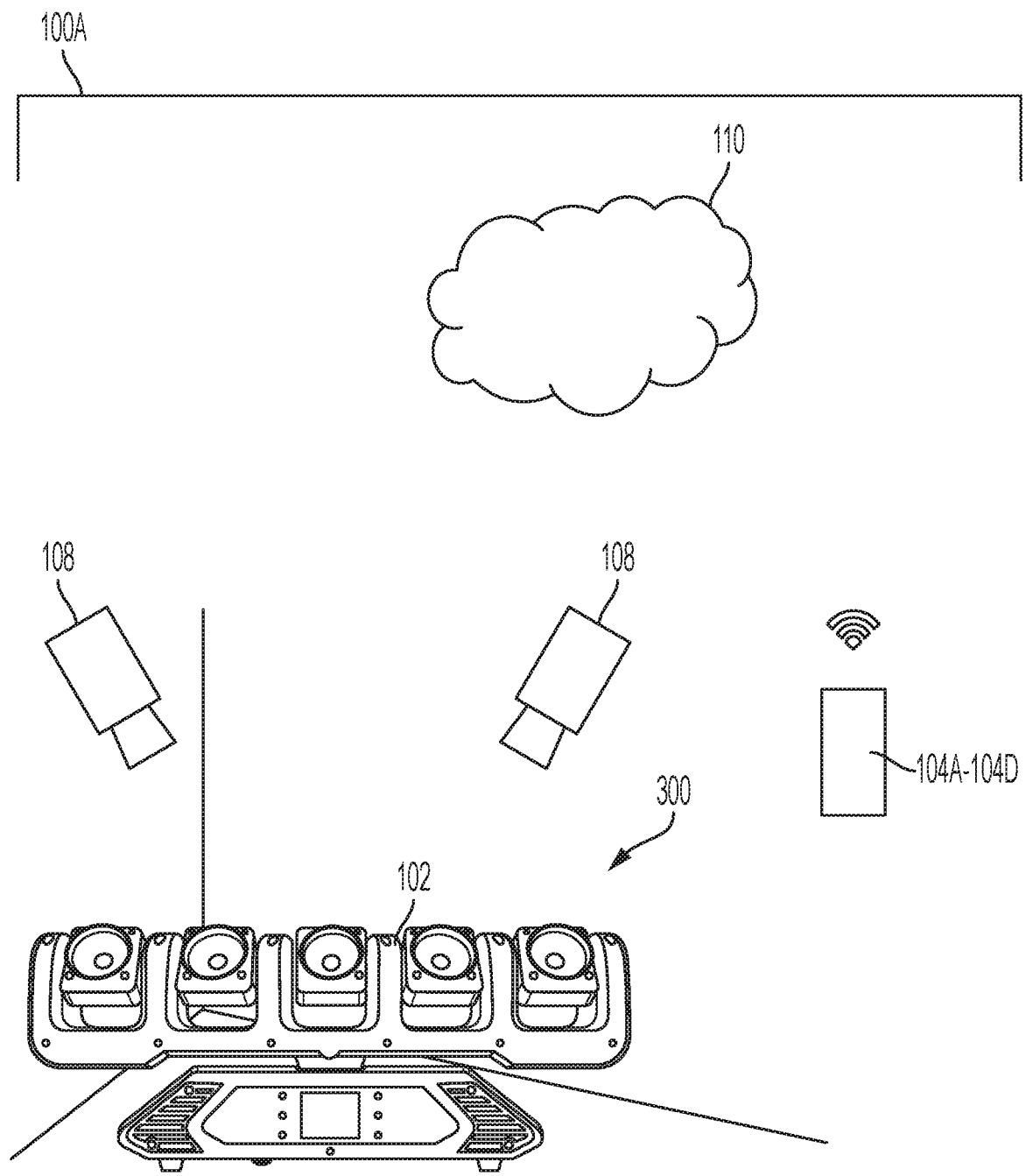
FIG. 8A illustrates cameras and another lighting fixture in a scanning arrangement for the system of FIG. 1A.
Figure 9:
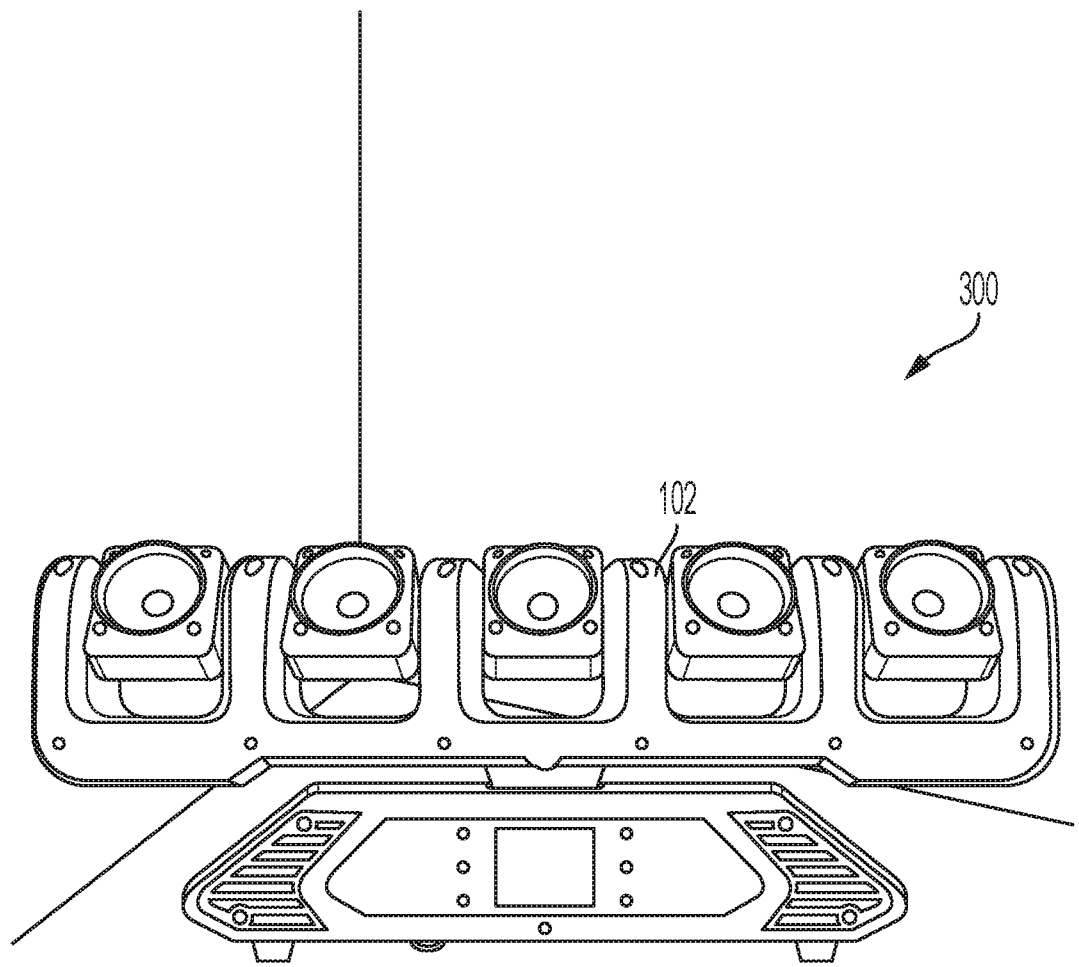
FIG. 9 illustrates a front elevation view of the lighting fixture of FIGS. 8 and 8A.
Figure 10:
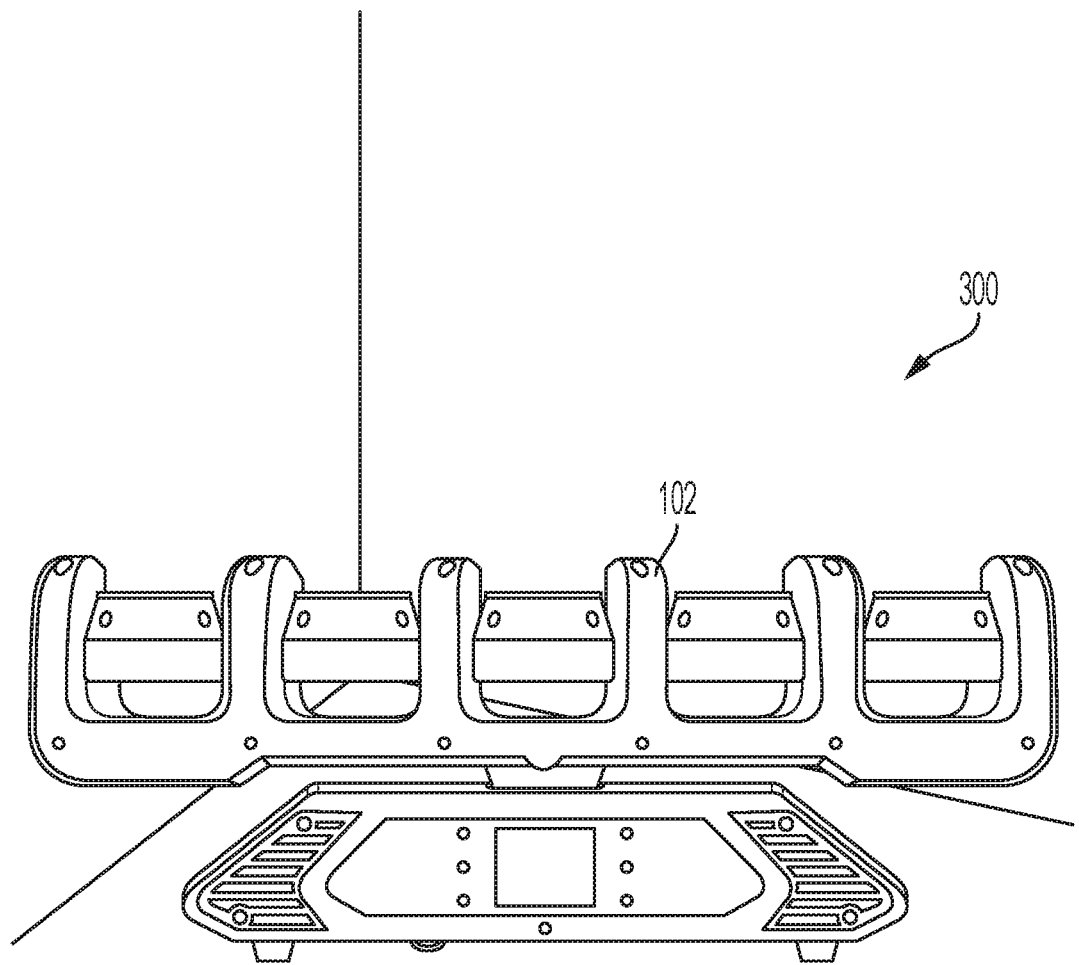
FIG. 10 illustrates a font elevation view of the lighting fixture of FIG. 9 in a home position.
Figure 11:
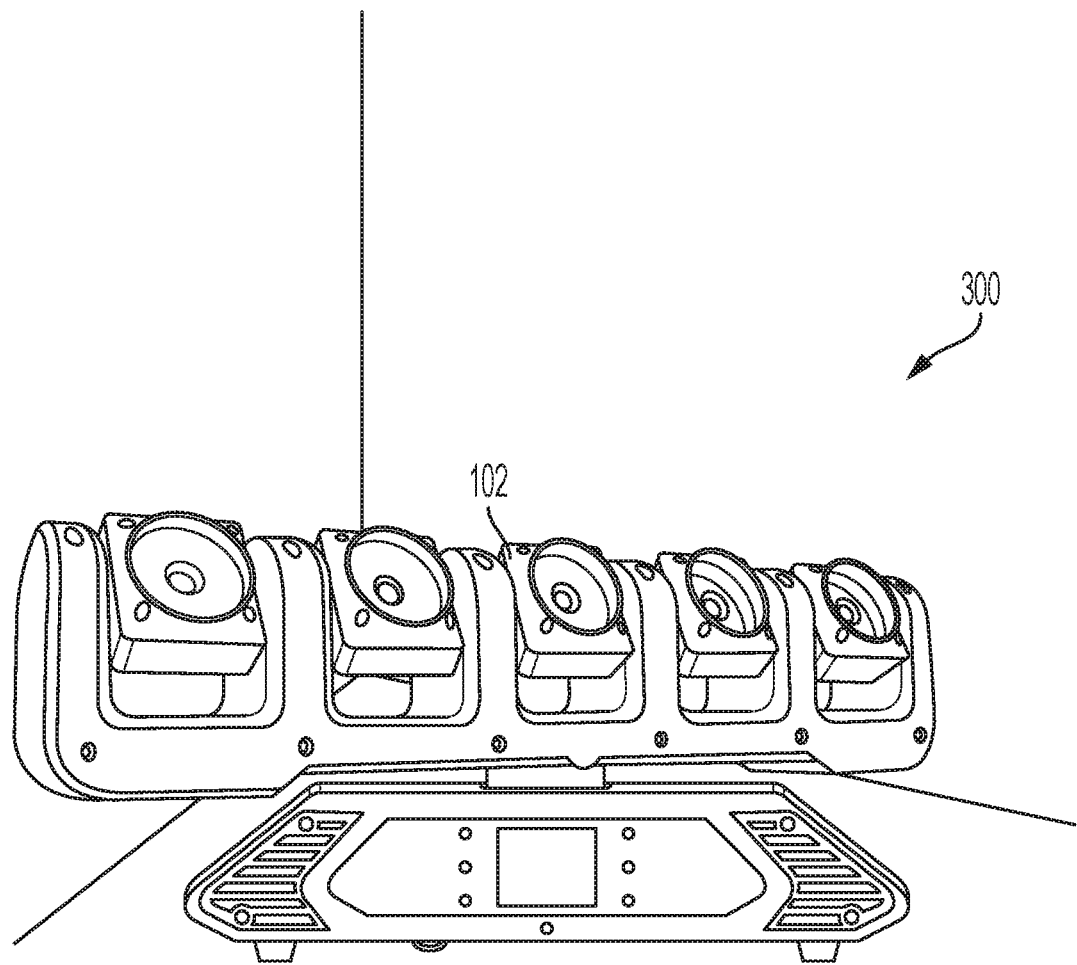
FIG. 11 illustrates a perspective view of the lighting fixture of FIG. 9.

FIG. 8 illustrates the system 100 in a scanning arrangement similar to that described above with regard to FIG. 3, but the lighting fixture 102 is of a different design. FIG. 8A illustrates the system 100A in a scanning arrangement similar to that described above with regard to FIG. 3A, but the lighting fixture 102 of a different design. FIG. 9 illustrates the light fixture 102 in a first position (e.g., a forward-facing position). FIG. 10 illustrates the light fixture 102 in a second position (e.g., a home position). FIG. 11 illustrates the light fixture 102 in a third position (e.g., a non-home position).

Figure 12:
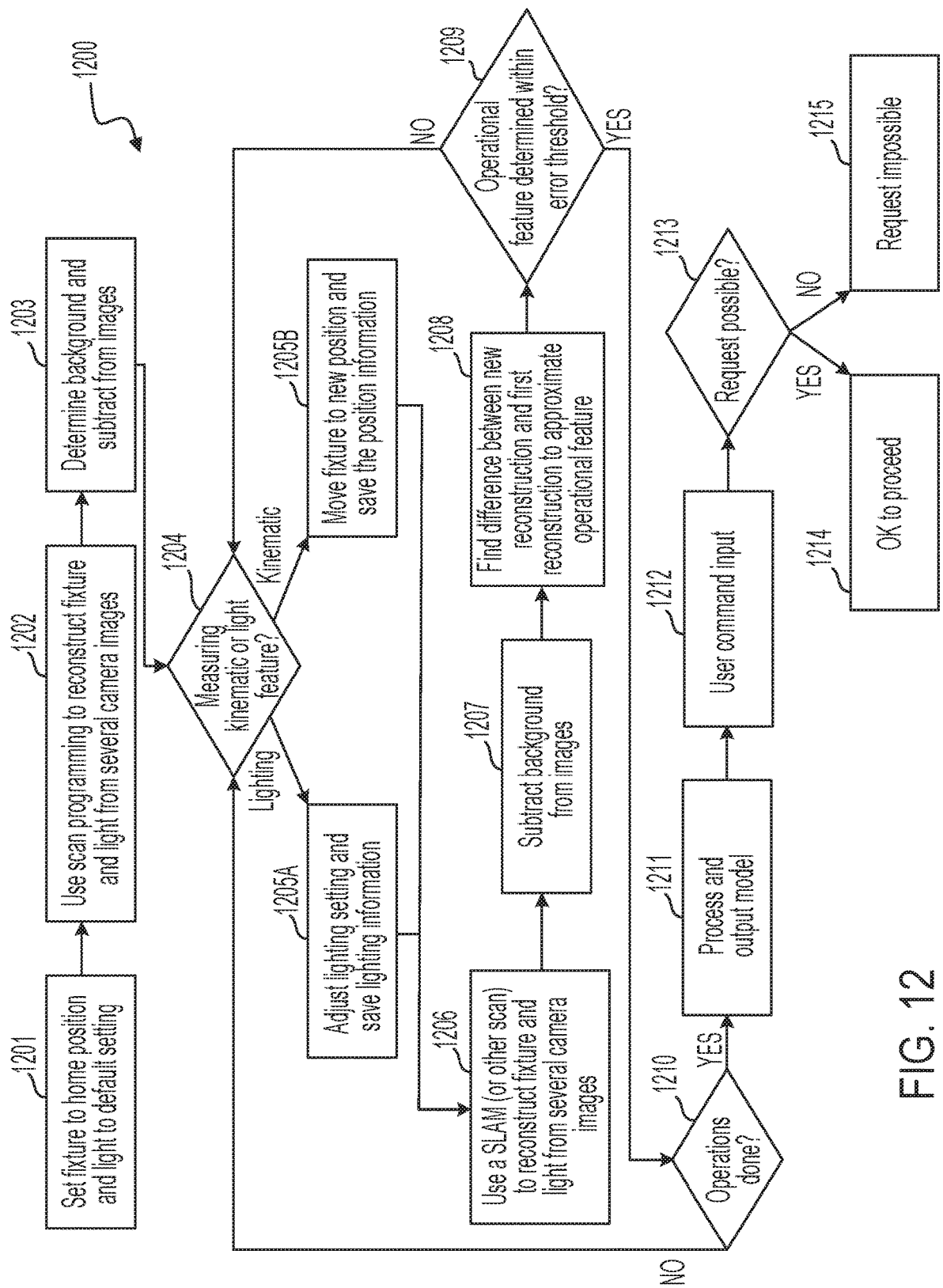
FIG. 12 illustrates a flowchart of an example mapping method of the system of FIGS. 1 and/or 1A.

As shown in FIG. 12, the system 100, 100A may operate according to a method 1200 of digitally modeling a lighting fixture 102. The modeling of the lighting fixture 102 is based on various operational states of the lighting fixture 102. The operational states include kinematic or positional states (e.g., movement and/or positional capabilities) of the lighting fixture 102. In some embodiments, the operational states additionally or alternatively include various lighting states (e.g., lighting effects or capabilities) of the lighting fixture 102. The method 1200 includes placing the lighting fixture 102 in the scanning zone (such as in the enclosure 300) of the one or more cameras 108 with the lighting fixture 102 in the home position or configuration (e.g., as shown in FIG. 5 or FIG. 10). The light produced by the lighting fixture 102 is also set to "on" with default settings (STEP 1201).

The method 1200 also includes scanning, with the cameras 108, the lighting fixture 102 and the light produced by the lighting fixture 102 (along with the background environment in the enclosure 300). The scan data is sent from the cameras 108 to the controller 200 (STEP 1202). When scanning the light produced by the lighting fixture 102, the cameras 108 capture images of a light receiving surface 302 as the light is projected on the receiving surface 302. The user may move the lighting fixture 102 through a series of manual commands (e.g., via the user input device 104 and/or the control board 106). In some embodiments, the controller 200 executes a program that configures the controller 200 to control the movement or make other adjustments of the lighting fixture 102 in a predetermined pattern. The program may also configure the controller to receive and/or monitor scan data corresponding to the programmed movements or other adjustments of the lighting fixture 102. In some embodiments, program configures the controller 200 to control the cameras 108 to capture image or scan data corresponding to the programmed movements or other adjustments of the lighting fixture 102.

The method 1200 further includes the controller 200 determining what aspects of the scan data correspond to the lighting fixture 102 and the light produced from the light fixture 102, determining what aspects of the scan data correspond to the enclosure 300, and subtracting or removing the aspects of the scan data corresponding to the enclosure 300 from the scan data (STEP 1203). In some embodiments, the controller 200 determines that aspects of the scan data relating to a certain color represent the enclosure 300, such as when using a bright green enclosure 300 or a white enclosure 300 surrounding the lighting fixture 102 and one or more cameras 108. The controller 200 can then remove these identified aspects of the enclosure from the scan data to leave only the aspects related to the light fixture.

The method 1200 also includes the controller 200 determining whether the cameras 108 should next scan the lighting fixture 102 in a new positional arrangement (e.g., a kinematic feature) based on one of many individually adjustable aspects of the lighting fixture 102 (STEP 1204). These adjustable aspects include, for instance, a pan of the lighting fixture 102, a tilt of the lighting fixture 102, an exterior shutter adjustment of the lighting fixture 102, a focus or zoom causing movement of exterior portions of the lighting fixture 102, or the like. Additionally or alternatively, the controller 200 determines whether the cameras 108 should next scan the light produced by the lighting fixture 102 (e.g., a light feature) while the lighting controls of the lighting fixture 102 are at a different setting (e.g., a lighting fixture configuration). The lighting controls settings include, for instance, brightness, color, duration, focus, shape, and the like. The kinematic features and lighting features of the lighting fixture 102 correspond to control parameters for the lighting fixture 102. The determination of whether to scan kinematic features or lighting features may be made manually by a user command (STEP 1204). Additionally or alternatively, the controller 200 operates according to a predetermined scan routine. In some embodiments, the controller 200 logs the scan data sequentially according to the current scanning task (e.g., for panning rotation).

If the controller 200 determines at STEP 1204 to proceed with measuring a lighting feature, the method 1200 further includes the controller 200 adjusting a lighting setting of the light produced by the lighting fixture 102 by changing one or more of the brightness, color, duration, focus, shape, or some combination thereof, of the light produced by the lighting fixture 102 (STEP 1205A).

If the controller determines at STEP 1204 to proceed with measuring a kinematic feature, the method 1200 further includes the controller 200 moving the lighting fixture 102 to a new positional arrangement by changing one or more of the individually adjustable aspects of the lighting fixture 102, such as panning the lighting fixture 102 and saving the new pan location data for comparison, tilting the lighting fixture 102 and saving the new tilt location data for comparison, some other positional change, or some combination thereof (STEP 1205B). In some embodiments, the user manually adjusts the lighting fixture 102 to each new position instead of the controller 200.

The controller 200 controls the power supplied to the lighting fixture 102 and can communicate with one or more actuators or motors connected to or associated with the lighting fixture 102 (e.g., housed internally within the light fixture 102) to command the adjustments of the lighting fixture 102. Additionally or alternatively, the controller 200 outputs a command signal to the user to adjust the lighting fixture 102 to the new lighting arrangement or positional arrangement either manually or through use of a control interface connected to the lighting fixture, such as the lighting control console 106.

After the light produced by the lighting fixture 102 has been changed to the new lighting setting or the lighting fixture 102 has been moved to the new positional arrangement, the method 1200 further includes scanning, with the cameras 108, the lighting fixture 102 and the background environment or the light produced by the lighting fixture 102 again (STEP 1206) in a similar manner as described above (e.g., using a SLAM program). The method 1200 then includes the controller 200 removing the background aspects of the scan data (STEP 1207) as previously described with respect to STEP 1203.

The method 1200 further includes the controller 200 analyzing the scan data from the first scan, where the lighting fixture 102 was in the home position and the light produced by the lighting fixture was set to the default setting, and the scan data from the subsequent scan, where the light produced by the lighting fixture 102 was at the new setting and/or the lighting fixture 102 was in the new positional arrangement. The first scan and the one or more subsequent scans are compared by the controller 200 to determine the differences between the scans to approximate an operational characteristic or trait of the lighting fixture 102 (STEP 1208).

For example, the operational trait may include any movement feature of the lighting fixture 102 including, for instance, the pan axis, the tilt axis, the zoom axis, the extreme limits of a given motion, the shutter adjustments, the iris adjustments, and the like. In some embodiments, positional data of many discrete points on the lighting fixture 102 are scanned while the lighting fixture 102 is in a home position (see FIG. 5). These points on the lighting fixture 102 can be used as reference points. After the movement of the lighting fixture 102, the controller 200 identifies several discrete points on the lighting fixture have moved. With multiple scans while the lighting fixture 102 is in multiple movement positions, the controller 200 detects that at least some of these discrete points on the lighting fixture have moved, for example, along an arcuate pathway. The controller 200 approximates a radius of curvature with regard to the arcuate pathway of each of the discrete points on the lighting fixture 102 and designates an axis of rotation. If the discrete points on the lighting fixture 102 have moved, for example, along a linear pathway, the controller 200 approximates an axis of translation (e.g., a pan axis, a tilt axis, etc.).

The operational trait may instead include any adjustment capabilities of the light produced by the lighting fixture 102 including, for instance, the brightness, color, duration, focus, shape, or some combination thereof. The change in the lighting feature produced by the lighting fixture 102 can be caused by one or more adjustments including, for instance, a change in the pulse width modulation of the power supplied to one or more light emitting diodes, a change in the combination of activated light emitting sources of the lighting fixture 102, an adjustment of an iris of the lighting fixture 102, and adjustment of a shutter of the lighting fixture 102, the introduction or removal of a gobo, the introduction or removal of a prism, operation of an animation wheel, and the like. Data gathered by the cameras 108 of the light projected on the light receiving surface 302 can be evaluated to determine where the light falls on the color spectrum (e.g., with respect to the CIE 1931 color space), the intensity of the light at various locations on the light receiving surface 302, or the like.

The controller 200 then determines whether enough data points were identified with the performed scans to determine the operational trait with sufficient accuracy (STEP 1209). For instance, if an axis of rotation is determined by observing a radius of curvature for an arcuate motion of discrete points on the lighting fixture 102, the controller 200 compares the axes of rotation corresponding to different discrete points. If two discrete points return different axes of rotation that are separated by a distance that exceeds a tolerance threshold, the controller 200 can perform another scan with different or additional discrete points on the lighting fixture 102. If the error threshold is exceeded (i.e., the operational traits are not determined with sufficient accuracy), the method 1200 returns to STEP 1204. In this instance of returning to STEP 1204, the previous scan data may be discarded, or it may be retained to augment the three-dimensional reconstruction through iteration and improvement with the additional scan(s). If the error threshold is not exceeded (i.e., the operational traits are determined with sufficient accuracy), the method 1200 proceeds to STEP 1210.

With regard to the lighting settings, the shape, for example, of the light produced by the lighting fixture 102 is determined by evaluating the light intensity on the light receiving surface 302 to determine where the light intensity begins to sharply decline. If the estimated edge of the light produced by the lighting fixture 102 on the light receiving surface 302 is uniform enough to determine a linear or arcuate boundary line within a tolerance threshold (e.g., has an identifiable shape), the method 1200 proceeds to STEP 1210. If the estimated edge of the light produced by the lighting fixture 102 on the light receiving surface 302 is too scattered to determine a linear or arcuate boundary line within the tolerance threshold, the controller 200 can perform another scan with additional granularity to obtain more data points (STEP 1204). The more granular scan can be used to provide a more accurate estimate of the edge of the light on the light receiving surface 302. Similar determinations can be made with respect to other lighting features (e.g., color with respect to the CIE 1931 color space).

The controller 200 then determines if all of the possible movements of the lighting fixture 102 have been performed and correspondingly scanned (STEP 1210). For example, whether the one or more motors coupled to or associated with the lighting fixture 102 may be commanded to rotate the lighting fixture 102. Once the scan data returns information that the discrete points of the lighting fixture 102 have not moved since the last scan (or since a last number of time interval scans), the controller 200 determines that a limit (e.g., an extreme limit, a specified limit, etc.) of the lighting fixture motion has been reached. Once the limit of one movement direction has been reached, the controller 200 can proceed to another motion of the lighting fixture 102. Once all possible control motions have been exhausted, the controller evaluates the series of limits in each possible controllable direction to mean the entire scanning process is complete.

In some embodiments, the controller 200 monitors the commands it has output to the one or more motors coupled to or associated with the lighting fixture 102. Because the controller 200 commands the one or more motors according to a movement routine for scanning purposes, the controller 200 monitors what movements are remaining in the routine based on command string timing data. Similarly, the controller 200 monitors the lighting setting commands it has output to the lighting fixture 102 according to the lighting routine for scanning purposes. The controller 200 determines what lighting settings are remaining in the routine based on the command string timing data.

Additionally or alternatively, the user may be prompted to input whether all desired movements and/or lighting settings of the lighting fixture 102 have been performed. If one or more operations remain, the user inputs the additional operation to be scanned and adjusts the lighting fixture 102 accordingly. Once all operations have been accounted for, the user inputs that the scanning process has been completed.

If there are remaining operations to be performed by the lighting fixture 102, the method 1200 returns to STEP 1204. If there are no more remaining operations to be performed, the method 1200 proceeds to process all the scan data and output a digital model (STEP 1211) using the above-described analysis and model generation techniques. The digital model is output, for instance, for display by the user device 104A-104D.

Once the digital model of the lighting fixture 102 has been completed, a user may input a particular requested operational function of the lighting fixture 102 (STEP 1212). All necessary orientation and mounting data of the lighting fixture 102 may be included in the request, or the orientation and mounting data may have been previously received by the controller 200.

The controller 200 receives the request from the user and determines, based on the model generated at STEP 1211, whether the lighting fixture 102 is capable of performing the requested operational function given the input orientation and mounting data (STEP 1213). If the lighting fixture 102 is capable of performing the requested operational function, the controller 200 indicates to the user that they may proceed (STEP 1214). In some embodiments, the controller 200 proceeds with performing the requested operational function after determining that the operational function is achievable by generating one or more control signals for the motor or light sources associated with the lighting fixture 102. If the lighting fixture 102 is not capable of performing the requested operational function, the controller 200 indicates to the user that the requested function is not possible (STEP 1215). Additionally or alternatively, the controller 200 indicates to the user other appropriate lighting fixtures 102, additional add-on accessories available for the current lighting fixture 102, other mounting or orientation possibilities for the current lighting fixture 102, and the like that may be used to accomplish the requested function (STEP 1215).

In some embodiments, the method 1200 does not include STEPS 1204 and 1205A, and instead proceeds from STEP 1203 to STEP 1205B. In other embodiments, the method 1200 does not include STEPS 1204 and 1205B, and instead proceeds from STEP 1203 to STEP 1205A. In these latter embodiments, the scanning may or may not require three-dimensional scanning. In some embodiments, the cameras 108 capture only images of the light receiving surface 302 of the enclosure 300 as the light is projected on the receiving surface 302 to determine the lighting capabilities of the lighting fixture 102.

Thus, embodiments described herein provide methods and systems for digitally approximating operational capabilities of a lighting fixture and controlling the lighting fixture based on those operational capabilities. Various features and advantages of some embodiments are set forth in the following claims.

What is claimed is:

1. A method for generating a three-dimensional model of a lighting fixture, the method comprising:
   receiving, by an electronic processor, first scanning data related to the lighting fixture while the light fixture is in a first configuration;
   adjusting the configuration of the lighting fixture;
   receiving, by the electronic processor, second scanning data related to the lighting fixture while the lighting fixture is in a second configuration;
   comparing, by the electronic processor, the first scanning data and the second scanning data;
   approximating, by the electronic processor, an operational capability of the lighting fixture based on the comparing of the first scanning data and the second scanning data;
   performing, by the electronic processor, three-dimensional mesh reconstruction based on the first scanning data and the second scanning data;

generating, by the electronic processor, the three-dimensional model.

2. The method of claim 1, wherein the adjusting the configuration of the lighting fixture includes panning the lighting fixture, tilting the lighting fixture, zooming the lighting fixture, moving a shutter of the lighting fixture, moving an iris of the lighting fixture, adding a gobo in the lighting fixture, and/or rotating a gobo in the lighting fixture.

3. The method of claim 1, wherein the operational capability is a pan axis of the lighting fixture; and/or wherein the operational capability is a tilt axis of the lighting fixture.

4. The method of claim 1, wherein the adjusting the configuration of the lighting fixture includes adjusting a color of light produced by the lighting fixture, adjusting a brightness of light produced by the lighting fixture, adjusting an overall shape of light produced by the lighting fixture, and/or adjusting a focus of a light produced by the lighting fixture.

5. The method of claim 1, wherein the adjusting the configuration of the lighting fixture includes transmitting, by the electronic processor, a drive signal to the lighting fixture to control of an actuator associated with the lighting fixture.

6. The method of claim 1, further comprising:
transmitting, by the electronic processor, a drive signal to one or more cameras configured to capture the first scanning data and the second scanning data.

7. The method of claim 1, wherein the first scanning data and the second scanning data include one of images of the lighting fixture and images of light projected on a surface by the lighting fixture.

8. The method of claim 1, further comprising:
receiving, by the electronic processor, a selected operation of the lighting fixture,
determining, by the electronic processor, a limitation of operation of the lighting fixture based on the three-dimensional model; and
indicating, on a user interface, the limitation of the operation of the lighting fixture in response to the selected operation of the lighting fixture.

9. The method of claim 1, further comprising:
generating, by the electronic processor, one or more drive signals for an actuator associated with the lighting fixture to control the lighting fixture in accordance with the operational capability.

10. A system for generating a three-dimensional model of a lighting fixture, the system comprising:
a controller that includes an electronic processor coupled to a memory, the memory is configured to store instructions that when executed by the electronic processor configure the controller to:
receive first scanning data related to a lighting fixture while the lighting fixture is in a first configuration,
receive second scanning data related to the lighting fixture after an adjustment to the lighting fixture to a second configuration,
compare the first scanning data and the second scanning data,
approximate an operational capability of the lighting fixture based on the comparison of the first scanning data and the second scanning data;
perform three-dimensional mesh reconstruction based on the first scanning data and the second scanning data, and
generate the three-dimensional model.

11. The system of claim 10, wherein the controller is further configured to:
pan the lighting fixture, tilt the lighting fixture, zoom the lighting fixture, move a shutter of the lighting fixture, move an iris of the lighting fixture, add a gobo in the lighting fixture, and/or rotate the gobo in the lighting fixture.

12. The system of claim 10, wherein the operational capability is a pan axis of the lighting fixture; and/or the operational capability is a tilt axis of the lighting fixture.

13. The system of claim 10, wherein the adjustment to the lighting fixture includes a color adjustment, a brightness adjustment, a shape of the light produced adjustment, and/or a focus adjustment.

14. The system of claim 10, wherein the controller is further configured to:
transmit a drive signal to the lighting fixture to control an actuator associated with the lighting fixture.

15. The system of claim 10, wherein the controller is further configured to:
transmit a drive signal to one or more cameras configured to capture the first scanning data and the second scanning data.

16. The system of claim 10, wherein the first scanning data and the second scanning data include one of images of the lighting fixture and images of light projected on a surface by the lighting fixture.

17. The system of claim 10, wherein the controller is further configured to:
receive a selected operation of the lighting fixture;
determine a limitation of operation of the lighting fixture based on the three-dimensional model; and
indicate the limitation of the operation of the lighting fixture in response to the selected operation of the lighting fixture.

18. A non-transitory computer readable medium having stored thereon a program for generating a three-dimensional model of a lighting fixture, the program being executable by an electronic processor to configure the electronic processor to:
receive first scanning data related to the lighting fixture while the light fixture is in a first configuration;
receive second scanning data related to the lighting fixture while the lighting fixture is in a second configuration;
compare the first scanning data and the second scanning data;
approximate an operational capability of the lighting fixture based on the comparison of the first scanning data and the second scanning data;
perform three-dimensional mesh reconstruction based on the first scanning data and the second scanning data; and
generate the three-dimensional model.

19. The non-transitory computer readable medium of claim 18, wherein the program further configures the electronic processor to:
adjust a pan, a tilt, a zoom, a shutter, an iris, and/or a gobo of the lighting fixture.

20. The non-transitory computer readable medium of claim 18, wherein the operational capability is a pan axis of the lighting fixture; and/or the operational capability is a tilt axis of the lighting fixture.

21. The non-transitory computer readable medium of claim 18, wherein the program further configures the electronic processor to:
adjust a color of light produced by the lighting fixture, adjust a brightness of light produced by the lighting fixture, adjust an overall shape of light produced by the lighting fixture, and/or adjust a focus of a light produced by the lighting fixture.

22. The non-transitory computer readable medium of claim 18, wherein the program further configures the electronic processor to:
  transmit a drive signal to the lighting fixture to control an actuator associated with the lighting fixture.

23. The non-transitory computer readable medium of claim 18, wherein the program further configures the electronic processor to:
  transmit a drive signal to one or more cameras configured to capture the first scanning data and the second scanning data.

24. The non-transitory computer readable medium of claim 18, wherein the first scanning data and the second scanning data include one of images of the lighting fixture and images of light projected on a surface by the lighting fixture.

25. The non-transitory computer readable medium of claim 18, wherein the program further configures the electronic processor to:
  receive a selected operation of the lighting fixture;
  determine a limitation of operation of the lighting fixture based on the three-dimensional model; and
  indicate, on a user interface, the limitation of the operation of the lighting fixture in response to the selected operation of the lighting fixture.

\* \* \* \* \*